UNITED STATES PATENT OFFICE.

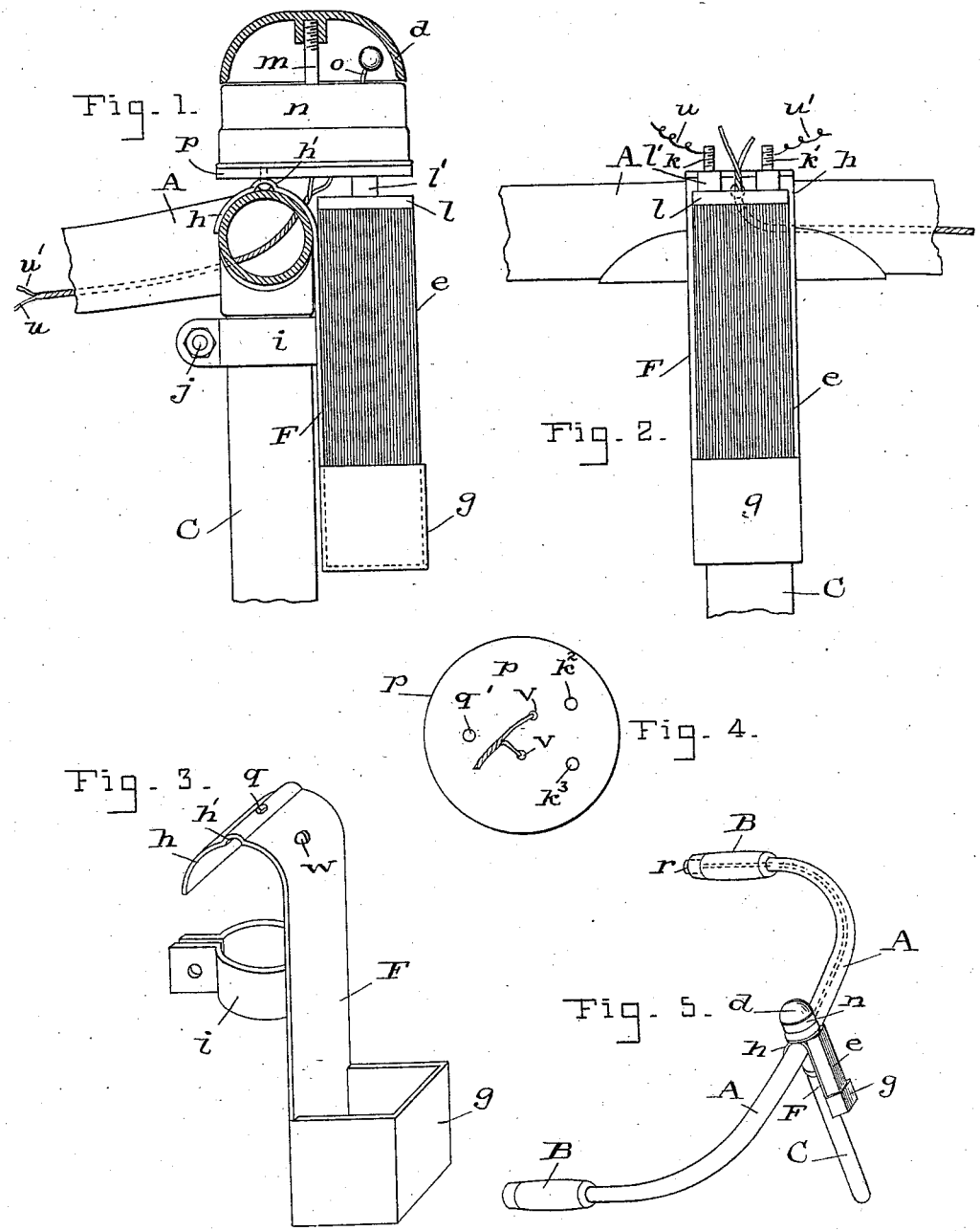

HERBERT B. EWBANK, JR., OF BALTIMORE, MARYLAND, ASSIGNOR OF ONE-HALF TO HERBERT BRYAN EWBANK, SR., OF SAME PLACE.

BICYCLE ELECTRIC BELL.

SPECIFICATION forming part of Letters Patent No. 575,059, dated January 12, 1897.

Application filed May 18, 1896. Serial No. 591,899. (No model.)

*To all whom it may concern:*

Be it known that I, HERBERT B. EWBANK, Jr., a citizen of the United States, residing at Baltimore, in the State of Maryland, have invented certain new and useful Improvements in Bicycle Electric Bells, of which the following is a specification.

This invention relates to improvements in mounting electric bells on bicycles.

The object of the invention is to provide for mounting all the parts, to wit, the battery, bell, wires, and make-and-break device, on the handle-bar, so that all of said parts shall remain immovable relative to each other and their relative position be unaffected by the turning movements of the handle-bar.

The invention is illustrated in the accompanying drawings, in which—

Figure 1 is a cross-section of the handle-bar and a side elevation of the bell, battery, and device which supports said parts on the handle-bar. The bell-gong is shown in section. Fig. 2 is a front elevation of a portion of the handle-bar and shows the supporting device, battery, and wires. Fig. 3 is a perspective view of the device which supports the bell and battery. Fig. 4 is an inverted plan view of the insulated base of the bell. Fig. 5 is a perspective view, on a smaller scale, of the handle-bar with all the parts of the electric bell attached. Fig. 6 is a section view of the push-button make-and-break device.

The letter A designates the handle-bar of a bicycle, B the handles, and C the post.

I provide a device for supporting the bell $d$ and battery $e$ on the handle-bar adjoining the post. The base of the bell is secured to the top of the battery. The supporting device consists of a back plate F, having at one side a pocket $g$, which receives the said battery $e$, and at the other side and top a down-pointing hook $h$, the top or back of which serves as a seat or part of the seat for the bell $d$, while the hook itself takes over the handle-bar A. The back plate F has vertical position alongside of the post C, and said plate has lateral curved clips $i$, one at each of the two vertical edges, and these clips take around the post and are tightly secured together by a bolt $j$, and thus clamp the post below the handle-bar.

The battery has at its top two upward-projecting screws $k\ k'$, which serve as poles. These screws extend through the insulating-plate $l$, and on top of said plate each screw has a nut $l'$. The bell-gong $d$ is mounted on a screw-stem $m$, which projects up from the top plate of the case $n$, which latter incloses a magnet, an armature, shank of hammer $o$, binding-posts, and wires, all of which are well-known parts in electric bells and unnecessary to describe here. The bell-hammer $o$ projects upward through a hole in the top plate of the case and is in position to strike the bell. The case $n$ has firmly secured to its bottom a plate $p$ of insulating material, and this plate has holes $k^2\ k^3$ for the said poles or screws $k\ k'$ of the battery. These poles or screws pass up through the base-plate $p$, and the nuts $l'$ abut against the lower surface of said plate. A nut inside of the case (not shown) is on each screw, and this construction secures the bell on top of the battery.

Only one half of the base-plate $p$ of the bell-case is over the top end of the battery $e$. The other half, therefore, projects laterally from said battery, and, as already stated, is seated on the top or back of the hook $h$. This hook has on top a "struck-up" raised seat $h'$, provided with a hole $q$, and the said base-plate has a corresponding hole $q'$. A rivet or screw (see Fig. 1) passes up through the hole $q$ in the hook, the head of the rivet or screw having position in the cavity in the under side of the hook, said cavity being formed by the struck-up or raised seat $h'$, and the rivet or screw then passes through the hole $q'$ in the base-plate and is secured above said plate.

It will be seen one half of the bell-base $p$ and the upper end of the battery $e$ are secured together. Then the other half of the bell-base is seated on the hook $h$ and is secured there by a rivet or screw, while the lower end of the battery fits in the pocket $g$. Thus the bell and battery are firmly held together, and both of these parts are fastened to the supporting device. This latter device is then attached to the handle-bar by means of the down-pointing hook $h$.

The make-and-break device consists of a push-button $r$ in the handle B, located in any preferred manner or position. In the present instance the end of the handle has a socket, and the push-button device $r$ fits in said socket. The push-button $r$ is kept out by a spring and carries a shank $s$, having at its end a head $s'$, which, when pushed, makes contact with two small curved plates $t$, separated by a split or space. This head $s'$ when pushed bridges across the said split or space and closes the circuit. The circuit-wires $u\ u'$ connect with the two plates $t$.

The circuit-wires $u\ u'$ from the poles (screws $k\ k'$) of the battery connect with the well-known electromagnet and armature mechanism inclosed in the case $n$. These wires then pass down through holes $v$ in the insulating base-plate, and said wires are covered or insulated, and through hole $w$ in the back plate F of the supporting device and through a hole in the tubular handle-bar A. The two covered or insulated wires are shown twisted together where they pass along within the tubular bar and connect with the two plates $t$ of the push-button.

By pushing the button $r$ the circuit will be closed and the bell $d$ will ring. The battery for this purpose may be very small, about one inch square in cross-section and about four inches long. Such a battery, it is said, has a capacity for current sufficient to ring the bell one hundred hours continuously.

Having thus described my invention, what I claim as new, and desire to secure by Letters Patent, is—

1. The combination of a bicycle handle-bar and post; a supporting device for a bell and electric battery comprising a plate having a pocket, a hook which takes over said handle-bar, and a clip which clamps around said post; an electric battery supported in said pocket; an electromagnetic bell supported on said hook; and a make-and-break device in circuit with said battery and bell.

2. In an electric bell for bicycles, the combination of a supporting device comprising a back plate having at one side a pocket, at the other side a downward-pointing hook, and lateral curved clips projecting at the same side as the hook; an electric battery seated in said pocket; and an electromagnetic bell having an insulated base-plate which is seated partly upon said hook and partly upon said battery and secured to both.

In testimony whereof I affix my signature in the presence of two witnesses.

HERBERT B. EWBANK, Jr.

Witnesses:
  HERBERT B. EWBANK, Sr.,
  CHAS. B. MANN, Jr.